(12) United States Patent
Kikuchi

(10) Patent No.: US 9,420,186 B2
(45) Date of Patent: Aug. 16, 2016

(54) FINDER OPTICAL SYSTEM AND IMAGE CAPTURING APPARATUS

(71) Applicant: Sony Corporation, Tokyo (JP)

(72) Inventor: Masahito Kikuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 176 days.

(21) Appl. No.: 14/081,316

(22) Filed: Nov. 15, 2013

(65) Prior Publication Data

US 2014/0160338 A1 Jun. 12, 2014

(30) Foreign Application Priority Data

Dec. 6, 2012 (JP) ................... 2012-267525

(51) Int. Cl.
| | |
|---|---|
| *G02B 25/00* | (2006.01) |
| *G02B 13/22* | (2006.01) |
| *G02B 13/18* | (2006.01) |
| *G02B 9/04* | (2006.01) |
| *G03B 13/02* | (2006.01) |
| *H04N 5/232* | (2006.01) |
| *G02B 9/60* | (2006.01) |
| G02B 7/02 | (2006.01) |
| G02B 7/34 | (2006.01) |
| G02B 27/01 | (2006.01) |
| G02B 13/00 | (2006.01) |

(52) U.S. Cl.
CPC .............. *H04N 5/23293* (2013.01); *G02B 9/60* (2013.01); *G02B 13/18* (2013.01); *G02B 13/22* (2013.01); *G02B 7/021* (2013.01); *G02B 7/34* (2013.01); *G02B 9/04* (2013.01); *G02B 13/003* (2013.01); *G02B 25/001* (2013.01); *G02B 27/0172* (2013.01); *G03B 13/02* (2013.01)

(58) Field of Classification Search
CPC ...... H04N 5/23293; G02B 7/021; G02B 3/18; G02B 25/001; G02B 13/22; G02B 7/34; G02B 13/003; G02B 9/04; G02B 27/0172; G03B 13/02
USPC ......... 359/643, 646, 663, 717, 744, 793–795; 396/373, 382, 374, 296; 348/333.09, 348/333.1–333.12
See application file for complete search history.

(56) References Cited

U.S. PATENT DOCUMENTS

| | | | | |
|---|---|---|---|---|
| 5,889,620 A * | 3/1999 | Furuta | .................... | G03B 13/06 359/683 |
| 6,094,310 A * | 7/2000 | Hankawa | ............. | G02B 25/001 359/643 |
| 2007/0053078 A1* | 3/2007 | Iiyama | ............... | G02B 13/0035 359/754 |
| 2010/0254005 A1* | 10/2010 | Matsumoto | .................... | 359/643 |
| 2012/0033311 A1* | 2/2012 | Uemura | ................ | G02B 13/04 359/753 |

FOREIGN PATENT DOCUMENTS

| | | |
|---|---|---|
| JP | 2002-082290 | 3/2002 |
| JP | 2004-258653 | 9/2004 |
| JP | 2007-264179 A | 10/2007 |
| JP | 2010-266776 | 11/2010 |

\* cited by examiner

*Primary Examiner* — Evelyn A Lester
(74) *Attorney, Agent, or Firm* — Chip Law Group

(57) ABSTRACT

A finder optical system includes, in the order from a display device side to an eye point side, a first lens group to increase a light beam height of a light beam bundle incident from a display device side and to emit the light beam bundle to the eye point side, and a second lens group having an image formation action.

11 Claims, 9 Drawing Sheets

FINDER OPTICAL SYSTEM AND IMAGE CAPTURING APPARATUS

CROSS REFERENCE TO RELATED APPLICATIONS

This application claims the benefit of Japanese Priority Patent Application JP 2012-267525 filed Dec. 6, 2012, the entire contents of which are incorporated herein by reference.

BACKGROUND

The present technology relates to a finder optical system to observe an image display screen of a display device and an image capturing apparatus using the same.

In general, when a specification of a finder optical system used in an electronic view finder such as a digital camera and a video camera is designed, design flexibility is low. For example, if a size of the display device to display an image is specified, a focal length is determined inevitably once a view angle is specified. Also, an F value of the optical system is inevitably determined by the focal length determined and an angle of emergence of a light beam emitted from the display device.

As a lens configuration of the finder optical system in the related art, there is known a three lens configuration in a triplet type having positive, negative and positive refractive indicies from an image display screen side to an eyes side (for example, see Japanese Patent Application Laid-open Nos. 2010-266776, 2007-264179, 2004-258653 and 2002-082290).

SUMMARY

In a finder using a small liquid crystal in the related art, a pupil diameter is often very small by the limitations that a display device is small and a view angle is wide. Many finders limit positions of eyes to a very narrow range.

Because the view angle is set to be widen, an actual eye relief distance may be undesirably felt quite shorter than the eye relief distance defined in the specification due to the relationship between the small pupil diameter and the rotation motion of the eyes when a viewpoint of a user is moved largely on the display screen (i.e., when an eye rotational movement occurs).

In a lens configuration used for a general finder, the size of the display device is approximately proportional to the length of the eye relief. The smaller the display device is, the shorter the eye relief is. When the finder is designed by a wider view angle, the eye rotational movement easily occurs, often resulting in a large vignetting and a hard-to-see finder.

Since the finder optical system is not telecentric at a display device side, colors are mixed because of a long distance between a color filter unit and a liquid crystal unit in the display device, and coloring and color turbidity are often seen in the finder. As high resolution display devices are developed, there is a need to take in a light beam emitted to a vertical direction of the image display screen in the finder optical system in order to make uniform an image quality and an amount of light. Also, there is necessity of a finder optical system having telecentric at the image display screen side.

As just described, the finder optical system in the related art is some inconvenient. Otherwise, some various improvements are necessary.

In view of the circumstances as described above, it is desirable to provide an easy to use finder optical system and an image capturing apparatus using the same.

(1) A finder optical system according to an embodiment of the present technology includes in the order from a display device side to an eye point side:

a first lens group to increase a light beam height of a light beam bundle incident from a display device side and to emit the light beam bundle to the eye point side; and a second lens group having an image formation action.

According to the embodiment of the present technology, the first lens group transits the light beam bundle incident from the display device externally to the optical axis to increase the light beam height. In the optical system including no first lens group, the eye relief is about 20 mm. In contrast, in the finder optical system of the embodiment according to the present technology, the eye relief is as long as about 35 mm. The finder optical system can be easily viewable and easy to use.

(2) In the finder optical system according to an embodiment of the present technology, the first lens group desirably includes a bioconcave lens; and a bioconvex lens adhered at an eye point side of the bioconcave lens.

According to the embodiment of the present technology, the first lens group is an adhered lenses group, thereby preventing color aberration from deteriorating.

(3) In the finder optical system according to an embodiment of the present technology, the first lens group desirably satisfies the following conditional equations (1) and (2)

$$KH7/KH9>1.65 \tag{1}$$

$$KH7/KH9<1.9 \tag{2}$$

where KH7 denotes a paraxial light beam height of a lens surface of the first lens group at the eye point side, and KH9 denotes a paraxial light beam height of a lens surface of the first lens group at the display device side.

According to the embodiment of the present technology, when the ratio of the light beam height of the light beam bundle incident on the first lens group to the light beam height of the light beam bundle emitted from the first lens group (KH7/KH9) exceeds 1.65, the eye relief can be sufficiently prolonged and the view angle can be widen. If the ratio is not within the range of 1.65 to 1.9, astigmatism aberration is deteriorated, whereby the optical system according to an embodiment of the present technology becomes difficult to use practically.

(4) In the finder optical system according to an embodiment of the present technology, the first lens group desirably satisfies the following conditional equations (3) and (4)

$$f\times(-0.1)<f45 \tag{3}$$

$$f\times 0.7>f45 \tag{4}$$

where f denotes an omnifocal distance, and f45 denotes a focal distance of the first lens group.

In the optical system according to the embodiment of the present technology, if the relationship between the focal distance of the first lens group and the omnifocal distance does not satisfy the above-described conditional equations (3) and (4), the astigmatism aberration is deteriorated, whereby the optical system according to an embodiment of the present technology becomes difficult to use practically.

(5) In the finder optical system according to an embodiment of the present technology, the first lens group desirably corrects image field curvature aberration.

(6) In the finder optical system according to an embodiment of the present technology, the second lens group desirably includes, in the order from the display device side to the eye point side, a plastic both-surface aspherical convex lens to correct Seidel aberration;

a bioconvex lens; and a concave meniscus lens having a concave face at the eye point side.

According to the embodiment of the present technology, the plastic both-surface aspherical convex lens is used as a third lens from the display device side, whereby the number of the lenses used for the optical system according to the embodiment of the present technology can be decreased, and the first lens group to increase the light beam height can correct successfully worsened Seidel aberration.

(7) The finder optical system according to an embodiment of the present technology is desirably telecentric at the display device side.

According to the embodiment of the present technology, the finder optical system according to the embodiment of the present technology has telecentric properties at the display device side, whereby it can be made best use of the light beam bundle emitted vertically from the image display screen of the image display device, and it can prevent color blur and color turbidity of the image at the peripheral part as well as limb darkening.

(8) In an image capturing apparatus according to an embodiment of the present technology includes:

an image capturing device;

a signal processing unit to convert a signal provided, by the image capturing device into an image signal;

a display device no display an image based on the image signal; and a finder optical, system, including in the order from a display device side to an eye point, side, a first lens group to increase a light beam height of a light beam bundle incident from a display device side and to emit the light beam bundle to the eye point side; and a second lens group having an image formation action.

According to the embodiment of the present technology, the eye relief of the finder optical system can be prolonged, thereby achieving an easy to use finder optical system and an image capturing apparatus using the same.

As described above, according to the embodiments of the present technology, the finder optical system and the image capturing apparatus using the finder optical system can be easy to use.

These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

[Features of Present Technology]

(Telecentric Properties)

A finder optical system according to the embodiment of the present technology is telecentric at the display device side in order to make best use of a light beam emitted from the display device. When the user peers obliquely at an image at a peripheral part of the display device, no coloring and no color turbidity caused by color mixture occur. Also, no limb darkening occurs, which may occur when the light beam emitted obliquely from the display device is weaker than the light beam emitted vertically.

(Large Pupil Diameter)

In the finder optical system according to the embodiment of the present technology, not only an F number of a center image, but also an effective F number of the peripheral part are kept small. Therefore, a pupil diameter in the finder optical system according to the embodiment of the present technology is larger than That in the finder optical system in the related art.

(Long Eye Relief)

As described above, in order to prolong the eye relief while keeping the telecentric properties at the display device side and the small F number within a range of all angle of view, the finder optical system according to the embodiment of the present technology is designed as a light beam path that widens externally the light beam incident on the optical system from the display device and guides the light beam to an eye point EP side.

(Visibility in Entire Visual Field)

As the finder optical system according to the embodiment of the present technology has the telecentric properties at the display device side, the large pupil diameter and the long eye relief, an entire visual field can be looked even when the positions of eyes are at a long distance from a design reference position.

When the finder optical system is used for a pair of eye glasses, goggles and the like, the entire visual field is easily viewable. As such, the finder optical system is suitable for professional use where the eyes are often at some distance from the finder.

[General Description about Lens Configuration]

Figure 1:
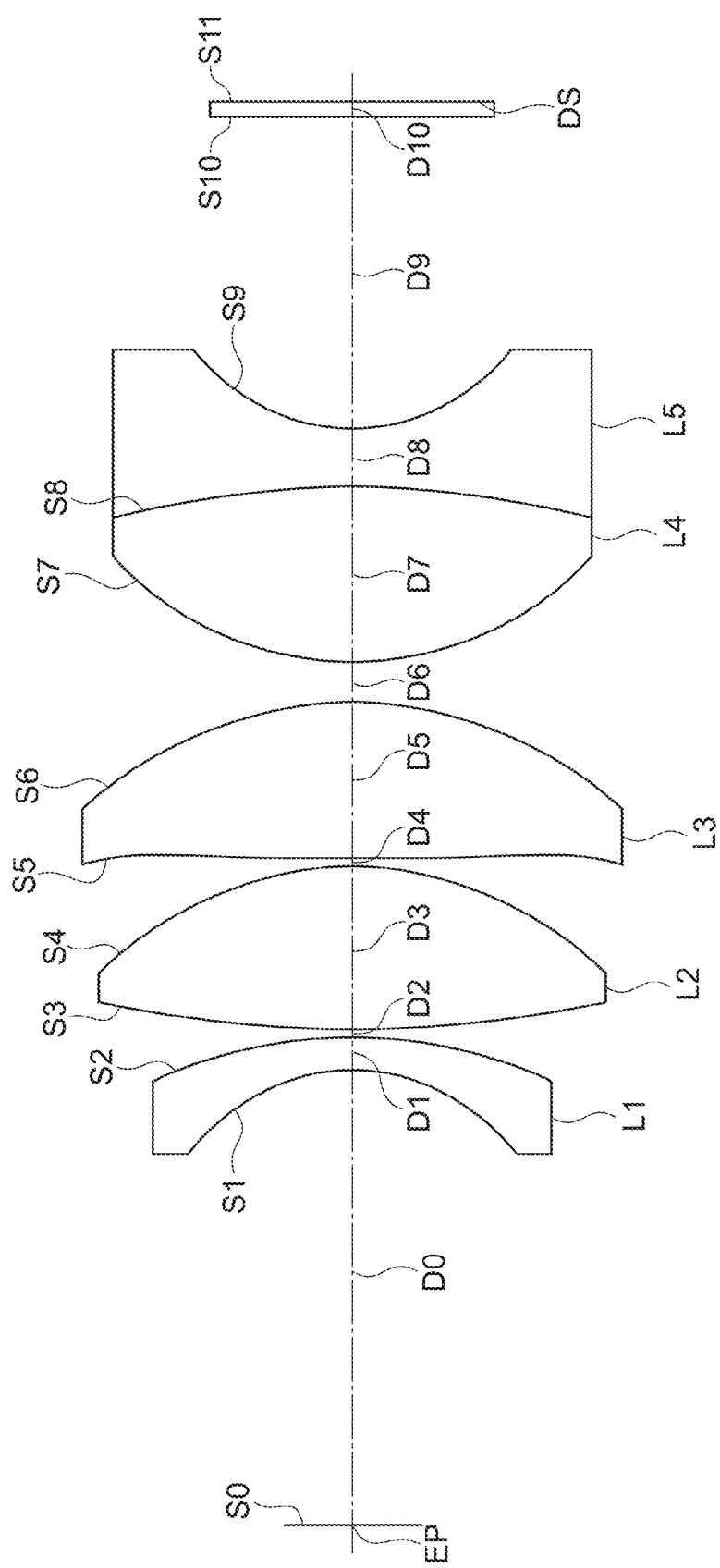
FIG. 1 is a sectional view along an optical axis of an electronic view finder using a finder optical system according to an embodiment of the present technology.

FIG. 1 is a sectional view along an optical axis of an electronic view finder using a finder optical system according to an embodiment of the present technology.

An eye point EP is at leftmost in FIG. 1, and an image display screen DS of the display device is at rightmost in FIG. 1. Sn represents an $n_{th}$ face from the eye point EP side, Ln represents an $n_{th}$ lens from the eye point EP side, and Dn represents an $n_{th}$ distance between the faces from the eye point EP side. Although the finder optical system is afocal, numbering is made from the eye point EP side opposite to a travel direction of the light beam in order to treat it similar to a general image formation optical system.

The finder optical system according to the embodiment of the present technology includes four groups including five lenses, and has an optical design that is telecentric at de display device side.

The lens configuration is, the order from the eye point EP side, 1) a concave meniscus lens having a concave face at the eye point side L1,
(2) a bioconvex lens L2,
(3) a plastic both-surface aspherical convex lens L3,
(4) a bioconvex lens L4,
(5) a bioconcave lens L5, and
(6) an image display screen DS of the image display device (image field).

The bioconvex lens L4 and the bioconcave lens L5 are adhered to form a lens group including two adhered lenses group L45 (a first lens group). The lens group including two adhered lenses group L45 is a meniscus group having almost no power and being thick, and functions to transit a peripheral image height of a light beam incident from the image display screen DS of the image display device to a high light beam height and to correct image field curvature aberration.

A light beam bundle emitted vertically from the peripheral image on the image display screen DS of the image display device is bent largely externally at a face S9 of the bioconcave lens L5 at the display device side, and gets away from the optical axis and transits externally while the light beam bundle passes through the thick lens group including two adhered lenses group L45. When the light beam bundle is exited from a face S7 of the lens group including two adhered lenses group L45 at the eye point EP side, the light beam bundle becomes afocal passing through the high light beam height.

In this way, by changing largely the light beam height, it is possible to design the finder optical system having the large pupil diameter along with the long eye relief. In addition, the lens group including two adhered lenses group L45 contributes mainly to the telecentric properties at the display device side of the optical system according to the embodiment of the present technology.

A lens group (a second lens group) including the concave meniscus lens L1, the bioconvex lens L2 and the plastic both-surface aspherical convex lens L3 should be called as a main lens, and functions to correct aberration and to form an image.

The plastic both-surface aspherical convex lens L3 has aspheric lens surfaces S5 and S6 to decrease spherical aberration, coma aberration and distortion increased by changing largely the light beam height by the lens group including two adhered lenses group L45.

The bioconvex lens L2 and the plastic both-surface aspherical convex lens L3 have large convex power, and mainly form an image. The powers of the bioconvex lens L2 and the plastic both-surface aspherical convex lens L3 are almost same, which helps to widen mutual eccentricity tolerance.

The concave meniscus lens L1 corrects color aberration.

[Conditional Requirements]

Conditional requirements of the finder optical system according to an embodiment of the present technology are as follows:

Firstly, the most important requirement is the following conditional equations (1) and (2)

$$KH7/KH9 > 1.65 \quad (1)$$

$$KH7/KH9 < 1.9 \quad (2)$$

where KH7 denotes a paraxial light beam height of a lens face S7 of the lens group including two adhered lenses group L45 (the first lens group) at the eye point EP side surface and KH9 denotes a paraxial light beam height of a lens face S9 of the lens group including two adhered lenses group L45 (the first lens group) at the image display screen side.

The requirement of the conditional equation (1) that specifies a ratio between the paraxial light beam height KH9 incident to the lens group including two adhered lenses group L45 and the paraxial light beam height KH7 emitted is very effective to provide a wide view angle and the long eye relief.

If the ratio between KH7 and KH9 is less than 1.65 that is specified in the conditional equation (1), a sagittal side of astigmatism aberration falls largely down to the eye point side, which is difficult to use practically. If the ratio between KH7 and KH9 exceeds 1.9 that is specified in the conditional equation (2), a meridional side of the astigmatism aberration falls largely down to the eye point side, which is difficult to use practically.

Secondly, the next important requirement is the following conditional equations (3) and (4):

$$f \times (-0.1) < f45 \quad (3)$$

$$f \times 0.7 > f45 \quad (4)$$

where f denotes an omnifocal distance, and f45 denotes a focal distance of the lens group including two adhered lenses group L45.

Here, if the focal distance f45 of the lens group including two adhered lenses group L45 is less than −0.1 times of the omnifocal distance f, the meridional side of the astigmatism aberration falls largely down to the eye point side, which is difficult to use practically. If the focal distance f45 of the lens group including two adhered lenses group L45 exceeds 0.7 times of the omnifocal distance f, the sagittal side of the astigmatism aberration falls largely down to the eye point EP side, which is difficult to use practically.

[About Lens Surface Data]

Here, specific numerical examples of lens surface data will be shown. As describe above, a surface number etc. are shown from the eye point EP side opposite to the travel direction of the light beam in order to treat it similar to a general image formation optical system.

R represents a curvature radius of each lens surface (optical surface), D represents a distance between lens surfaces on the optical axis, Nd represents a refractive index of each lens (optical medium) to the d line (587.6 nm), and Vd represents the Abbe number of each lens (optical medium) to the d line.

KH represents the paraxial light beam height when an incident height is defined as 1. The curvature radius R, the distance between lens surfaces D, the paraxial light-beam height KR and the diameter are in millimeters (mm).

In the lens surface data, each asterisk [*] attached at a right side of the surface number shows that the lens surface is aspheric.

(Surface Data)
Surface number R D Nd Vd KH Diameter Remarks
0 ∞ 28.1 -- 5 eye position EP
1 −16.380 2.0 1.673 32.20 1.00 11.30 concave meniscus lens
2 −40.040 0.5 -- 1.05 11.40
3 100.600 10.0 1.487 70.45 1.06 13.20 bioconvex lens 4 −29.100 0.5 -- 1.18 15.00
5* 199.096 9.7 1.531 55.80 1.18 16.20 plastic both-surface aspherical convex lens
6* −28.701 2.5 -- 1.15 17.10
7 26.850 10.8 1.773 49.62 1.09 14.50 bioconcave lens
8 −76.800 3.5 1.698 30.05 0.74 10.90 bioconvex lens
9 16.100 19.2 -- 0.62 9.70
10 −1.0 1.516 64.20 0.13 9.00 cover glass
11 −0.0 -- 0.00 9.00 image display screen DS of image display device (Aspherical Data)
Aspherical equation $$\text{Sag amount} = ((1/R) \times H^2)/(1+\text{sqr}(1-(1/R)^2 \times H^2))+A4 \times H^4+A6 \times H^6+A8 \times H^8$$

Aspherical coefficients (five surfaces)
Fourth (A4) −6.18E-06
Sixth (A6) −1.73E-09
Eighth (A8) −1.14E-11
Aspherical coefficients (six surfaces)
Fourth (A4) 8.09E-06
Sixth (A6) −7.99E-10

In this regard, an aspherical sag amount is based on a plane orthogonal to the optical axis including an intersection of the lens surface and the optical axis, and is a distance from the plane to the lens surface at a distance H from the optical axis. The symbol "sqr" represents a square-root operation. R represents a curvature radius as described above, and A4, A6 and A8 represent the fourth, sixth and eighth aspherical coefficients, respectively.

Each numerical value after the symbol "E" represents a power index having a base of 10. For example, "−6.18E-06" means "$-6.18 \times 10^{-6}$".

(Other Data)
Maximum image height: 9 mm
Omnifocal distance: 32 mm
Pupil diameter: φ10 mm

[Advantages of Embodiments According to the Present Technology]

Here, advantages of embodiments according to the present technology will be summarized below.

(1) In the typical triplet configuration, the eye relief is about 20 mm. In contrast, in the finder optical system of the embodiments according to the present technology, the eye relief is as extremely long as about 35 mm. In addition, not only the pupil diameter of an image center, but also the pupil diameter of the peripheral part can have a same size as the center part. As a result, an excellent image quality can be kept even if the positions of eyes are moved.

(2) The finder optical system of the embodiments according to the present technology can have an excellent image quality having less chromatic aberration of magnification, coma aberration and distortion even at the peripheral part, despite a design specification of a wide view angle.

(3) The finder optical system of the embodiments according to the present technology has excellent telecentric properties at the display device side, therefore operates as if an entire area of the image display screen DS in the display device is looked from directly above, and is unaffected by angular dependency of the display device. Thus, the finder optical system of the embodiments according to the present technology can have uniform brightness even at the peripheral part of the image display device, and can keep a uniform color tone even at the peripheral part.

[Optical Path Diagram, Aberration Diagram etc.]

Here, an optical path diagram, an aberration diagram etc. will be described. Although the finder optical system is afocal, the image display screen DS of the display device is treated as the image field by reversing the travel direction of the light beam in the aberration diagram in order to treat it similar to a general image formation optical system.

Figure 2:
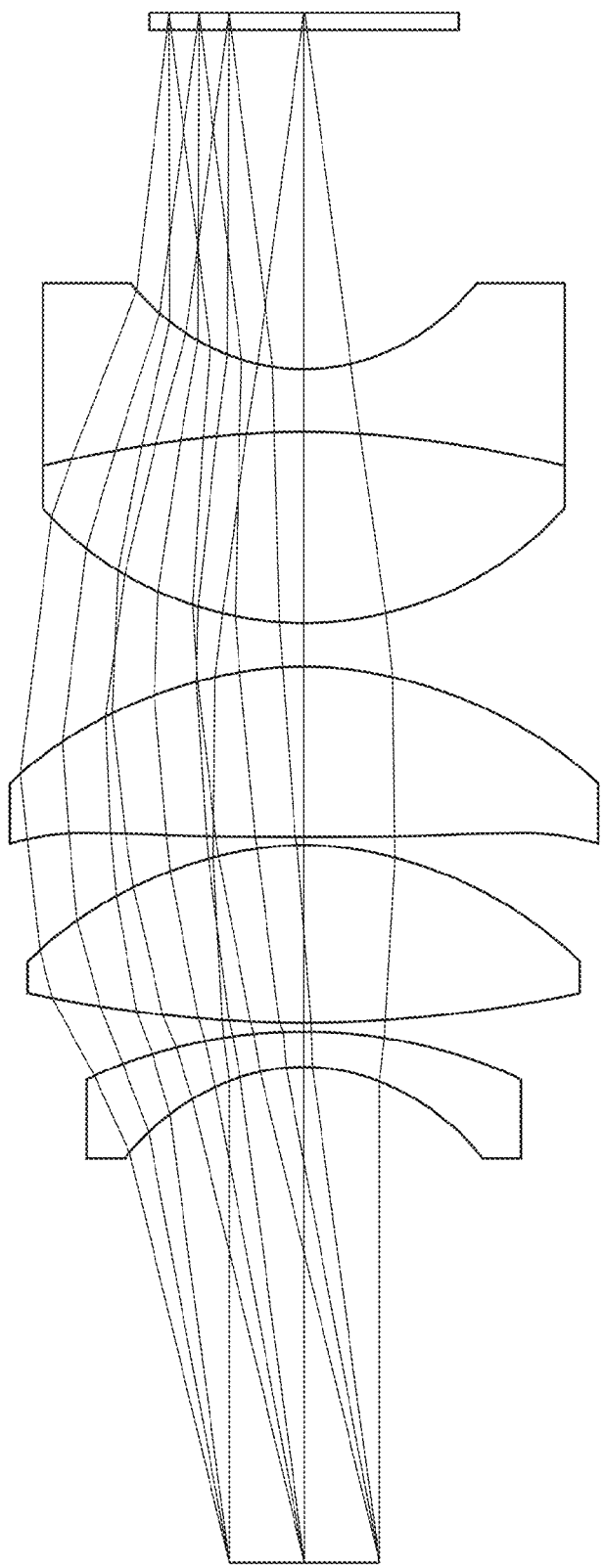
FIG. 2 is an optical path diagram of the finder optical system according to an embodiment of the present technology.

FIG. 2 is the optical path diagram of the finder optical system according to an embodiment of the present technology.

Figure 3:
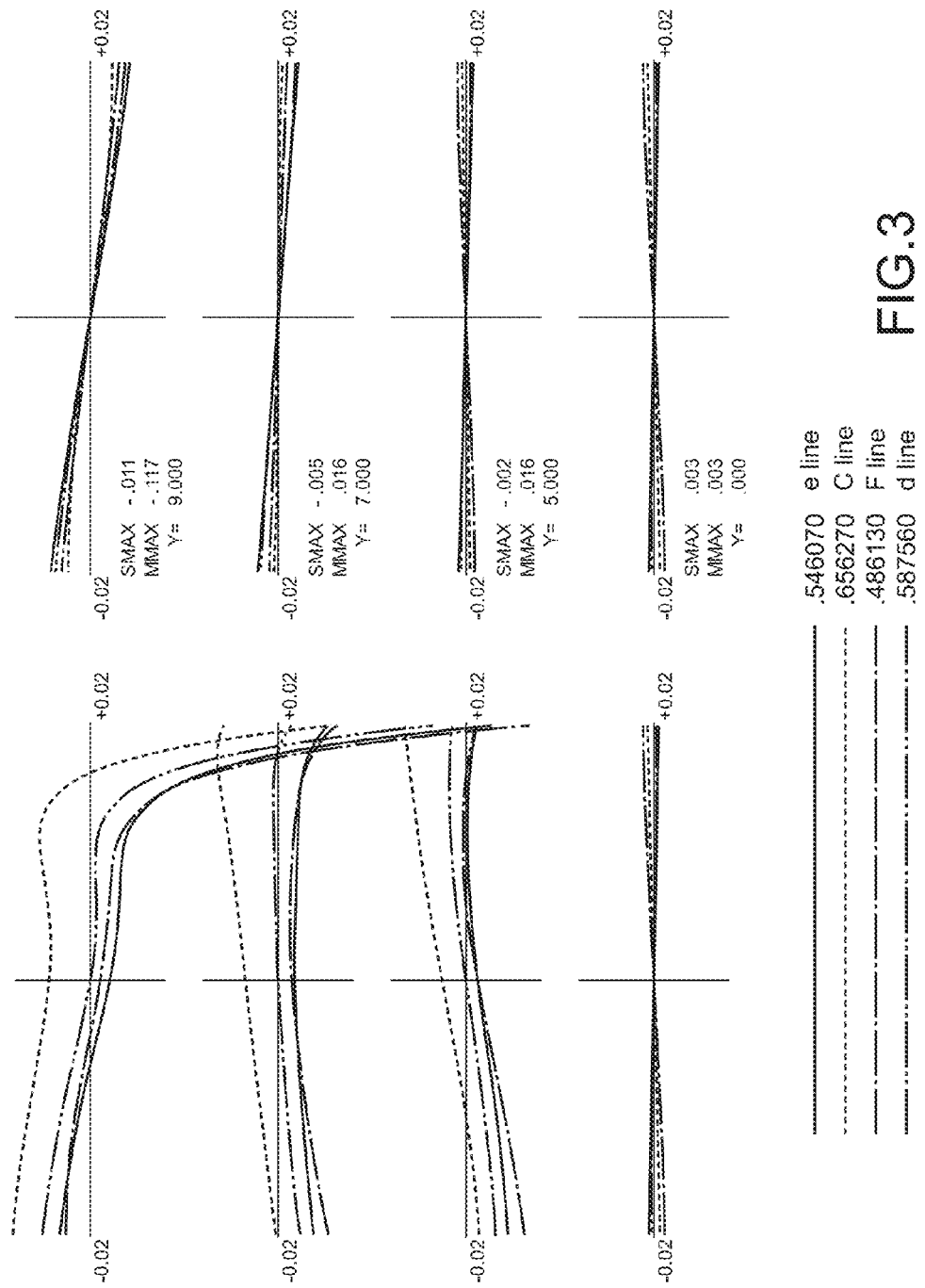
FIG. 3 shows coma aberration diagrams of the finder optical system according to an embodiment of the present technology.

FIG. 3 shows coma aberration diagrams. A drawing scale is ±0.02 mm. The coma aberration diagrams at the left side of FIG. 3 are about a meridional surface, and the coma aberration diagrams at the right side of FIG. 3 are a sagittal surface. The aberrations are at the image heights of 9 mm, 7 mm, 5 mm, and 0 mm beginning at the top of FIG. 3. A solid line represents an e line, a dotted line represents a C line, a dashed-dotted line represents an F line, and a dashed two-dotted line represents a d line.

Figure 4:
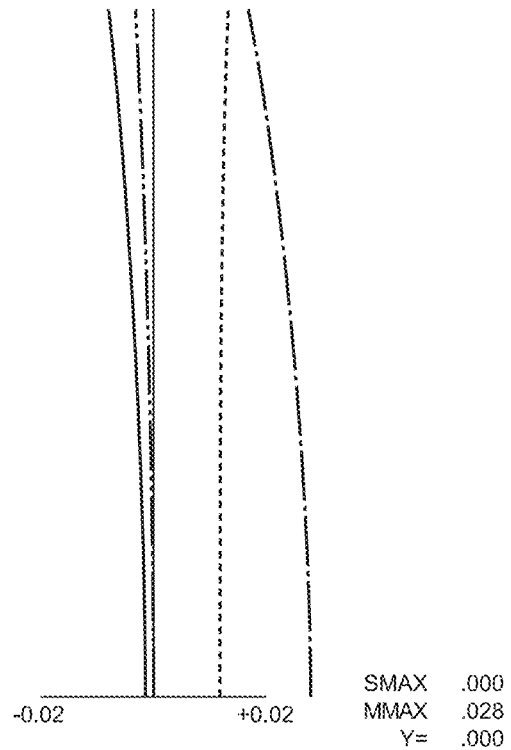
FIG. 4 is a spherical aberration diagram of the finder optical system according to an embodiment of the present technology.

FIG. 4 is a spherical aberration diagram. A vertical axis represents a light beam height, and a horizontal axis represents a distance in the optical axis direction. A drawing scale is ±0.02 mm. A solid line represents an e line, a dotted line represents a C line, a dashed-dotted line represents an F line, and a dashed two-dotted line represents a d line.

Figure 5:
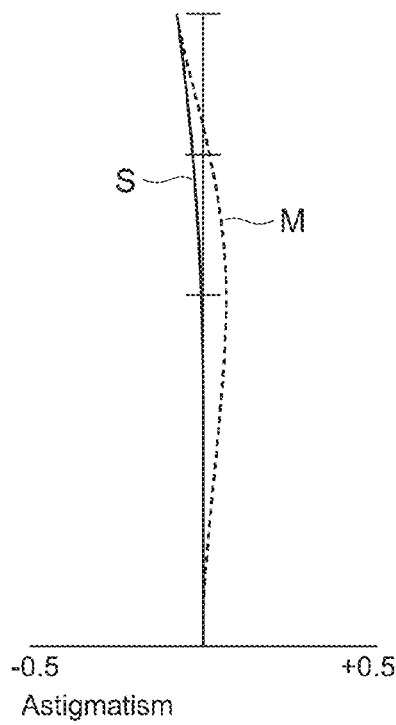
FIG. 5 is an astigmatism aberration diagram of the finder optical system according to an embodiment of the present technology.

FIG. 5 is an astigmatism aberration diagram. A vertical axis represents an image height, and a horizontal axis represents an out-of-focus amount. A drawing scale is ±0.5 mm. A dotted line (M) represents the meridional direction, and a dotted line (S) represents the sagittal direction. FIG. 5 reveals that the astigmatism aberration is within ±0.1 mm and is high-order corrected.

Figure 6:
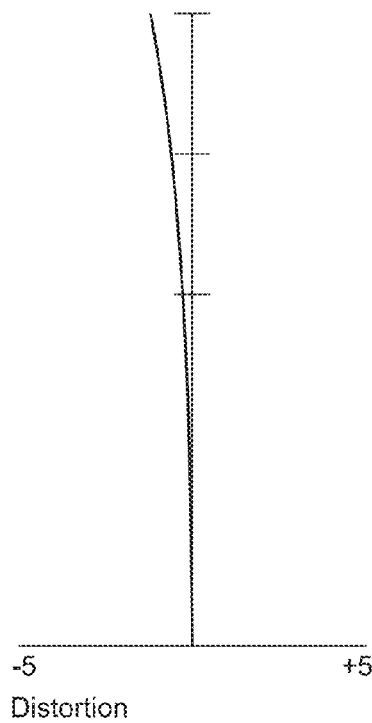
FIG. 6 is a distortion aberration diagram of the finder optical system according to an embodiment of the present technology.

FIG. 6 is a distortion aberration diagram. A vertical axis represents an image height, and a horizontal axis represents a strain amount. A drawing scale is ±0.5 mm.

Figure 7:
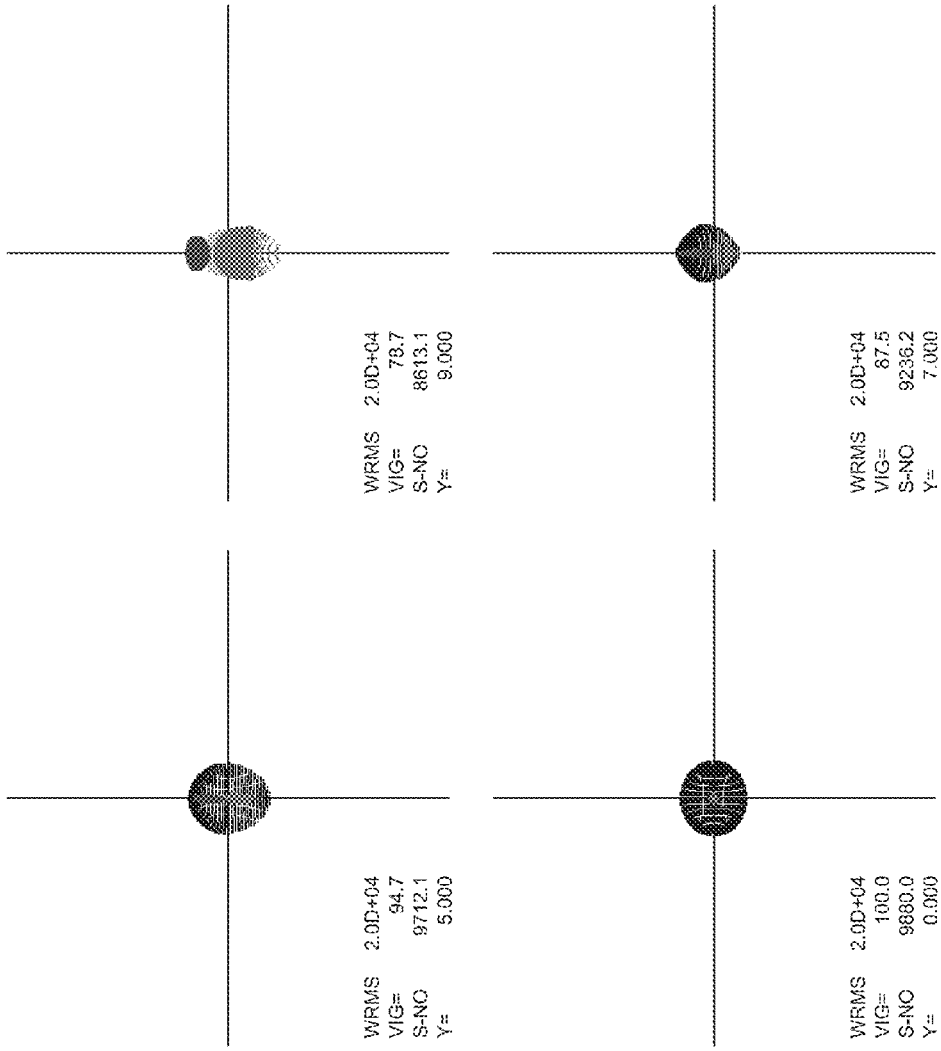
FIG. 7 is spot diagrams of the finder optical system according to an embodiment of the present technology.

FIG. 7 is spot diagrams. A drawing scale is 0.1 mm from the center to the end of the cross. In the left lower diagram, the image height is 0 mm. In the left upper diagram, the image height is 5 mm. In the right lower diagram, the image height is 7 mm. In the right upper diagram, the image height is 9 mm.

Figure 8:
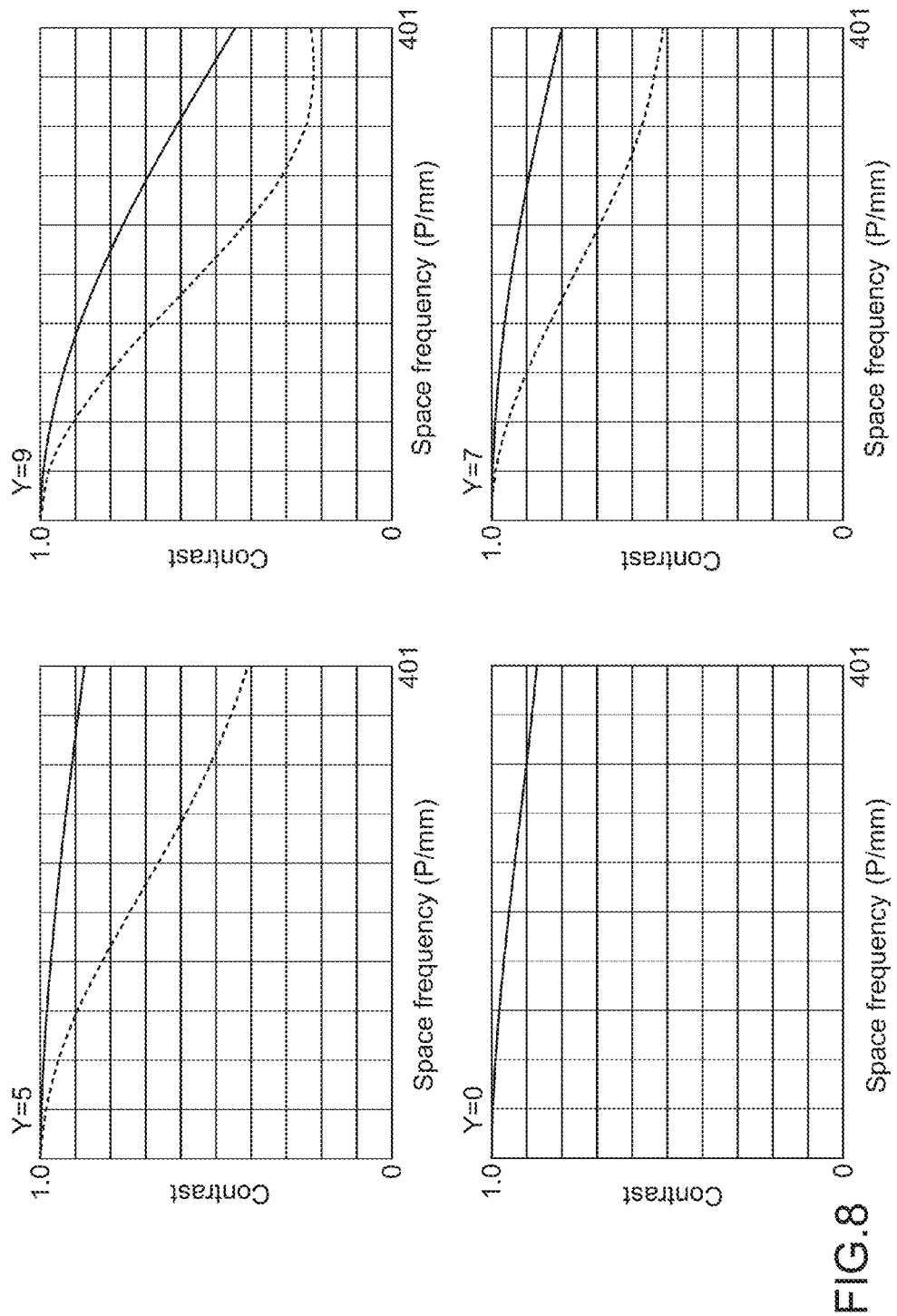
FIG. 8 is white MTF characteristic diagrams of the finder optical system according to an embodiment of the present technology.

FIG. 8 is white MTF (Modulation Transfer Function) characteristic diagrams. In each diagram, a vertical axis represents a contrast (modulation), and a horizontal axis represents a space frequency. A maximum frequency is 40 l p/mm. In the left lower diagram, the image height is 0 mm. In the left upper diagram, the image height is 5 mm. In the right lower diagram, the image height is 7 mm. In the right upper diagram, the image height 9 mm.

Figure 9:
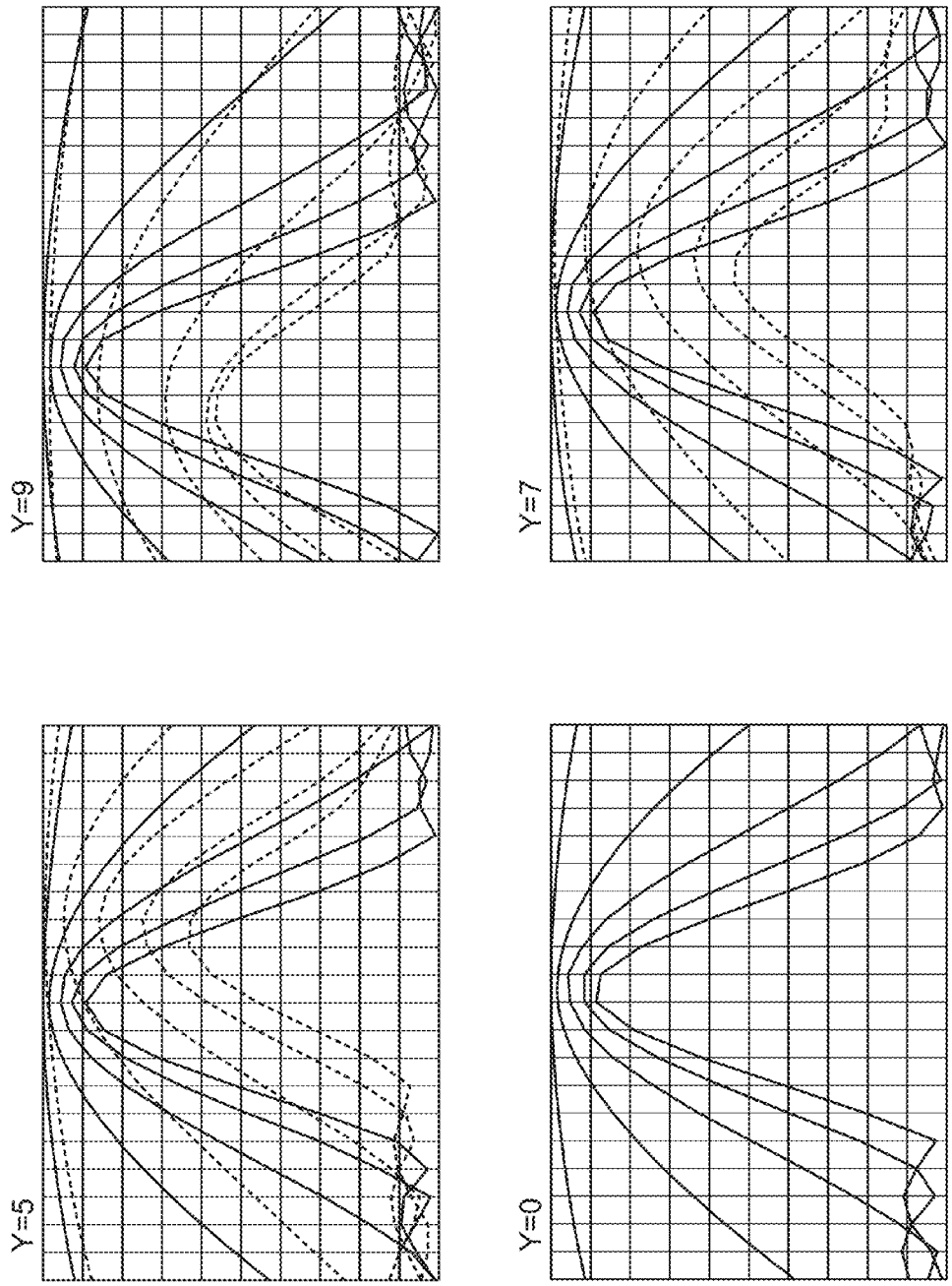
FIG. 9 is defocus MTF characteristic diagrams of the finder optical system according to an embodiment of the present technology.

FIG. 9 is defocus MTF characteristic diagrams. In each diagram, a vertical axis represents a contrast (modulation), and a horizontal axis represents a focus shift position. A defocus width is ±0.2 mm. In the left lower diagram, the image height is 0 mm. In the left upper diagram, the image height is 5 mm. In the right lower diagram, the image height is 7 mm. In the right upper diagram, the image height is 9 mm.

[General Description about Capturing Apparatus]

Figure 10:
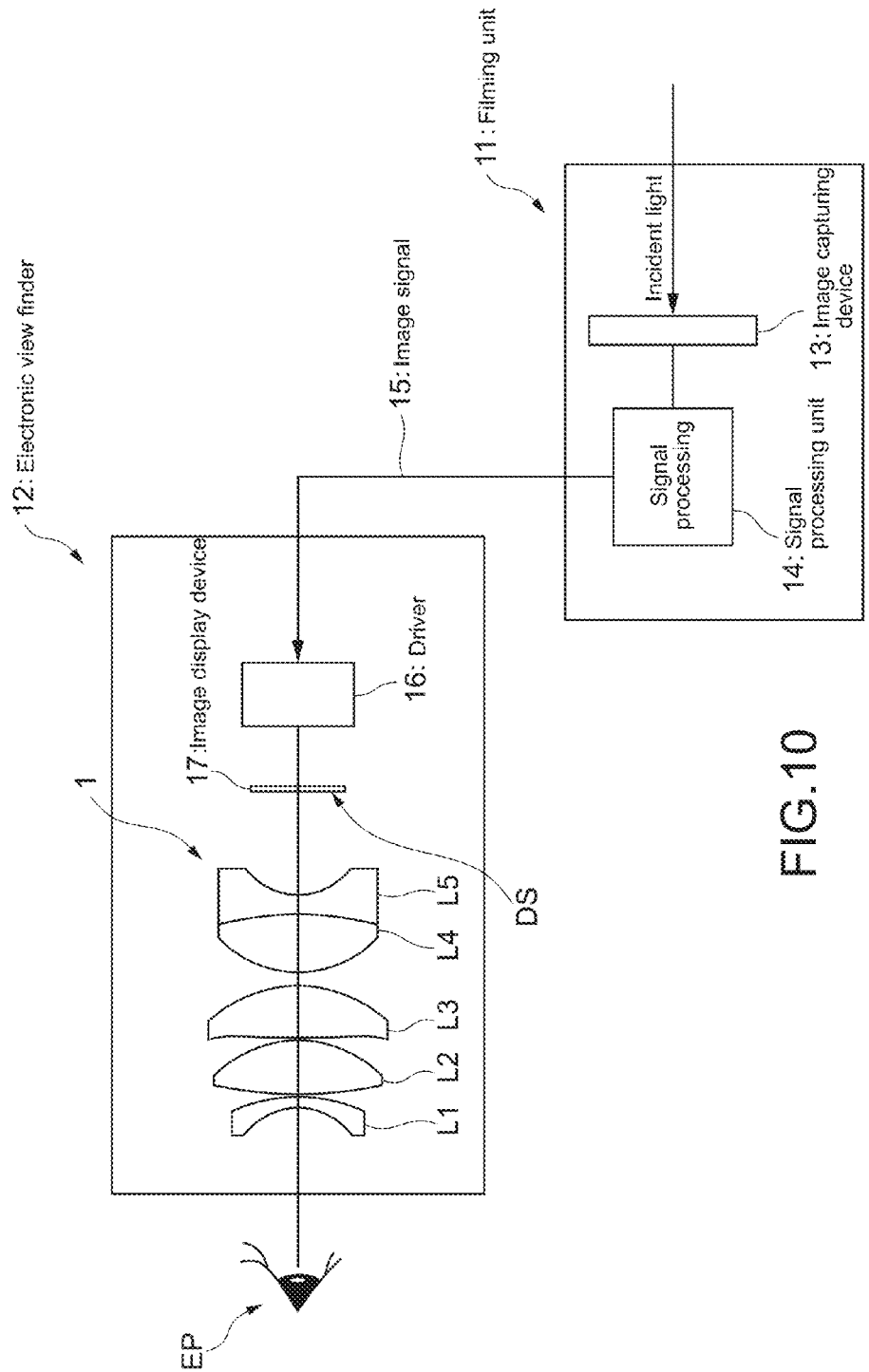
FIG. 10 is an electronic view finder and an image capturing apparatus using the finder optical system according to an embodiment of the present technology.

Here, an electronic view finder and a capturing apparatus using the finder optical system according to an embodiment of the present technology will be briefly described. FIG. 10 is an electronic view finder 12 and an image capturing apparatus 10 using the finder optical system 1 according to the embodiment of the present technology.

In the image capturing apparatus 10, a filming unit 11 and the electronic view finder 12 are just shown. The filming unit 11 is composed of an image capturing device 13 such as a CCD image capturing device and a CMOS image capturing device, and a signal processing unit 14, for example. The electronic view finder 12 is composed of an image display device 17 and the finder optical system 1.

An incident light passed through an image capturing optical system (not shown) forms an image on a light receiving surface of the image capturing device 13. A signal provided by light receiving of the image capturing device 13 is converted into an image signal 15 at the signal processing unit 14. The image signal 15 is transmitted to the electronic view finder 12, and is displayed on the image display device 17 such as a liquid display panel via a driver 16.

The user looks at the image display screen DS of the image display device 17 on which the image is displayed via the finder optical system 1 from the eye point EP side. In this way, the image adjusted to an adequate size can be seen on the image display screen DS.

In the electronic view finder 12 of the image capturing apparatus 10, the finder optical system 1 is composed of the first lens group to increase a light beam height and the second lens group having an image formation action. As a result, the electronic view finder 12 according to the embodiment of the present technology is easily viewable, because the view angle becomes wide, a pupil diameter is increased and an eye relief becomes long.

[Supplemental]

Otherwise, the present technology is not limited to the above-described embodiments, and it should be appreciated that some variations and modifications may be made without departing from the scope of the present technology.

[Other Configuration of the Present Technology]

The present disclosure may have the following configurations.

(1) A finder optical system, including in the order from a display device side to an eye point side:
a first lens group to increase a light beam height of a light beam bundle incident from a display device side and to emit the light beam bundle to the eye point side; and
a second lens group having an image formation action.

(2) The finder optical system according to (1), in which
the first lens group includes
a bioconcave lens; and
a bioconvex lens adhered at an eye point side of the bioconcave lens.

(3) The finder optical system according to (1) or (2), in which
the first lens group satisfies the following conditional equations (1) and (2):

$$KH7/KH9 > 1.65 \quad (1)$$

$$KH7/KH9 < 1.9 \quad (2)$$

where KH7 denotes a paraxial light beam height of a lens surface of the first lens group at the eye point side, and KH9 denotes a paraxial light beam height of a lens surface of the first lens group at the display device side.

(4) The finder optical system according to any one of (1) to (3), in which
the first lens group satisfies the following conditional equations (3) and (4):

$$f \times (-0.1) < f45 \quad (3)$$

$$f \times 0.7 > f45 \quad (4)$$

where f denotes an omnifocal distance, and f45 denotes a focal distance of the first lens group.

(5) The finder optical system according to any one of (1) to (4), in which
the first lens group corrects image field curvature aberration.

(6) The finder optical system according to any one of (1) to (5), in which the second lens group includes, in the order from the display device side to the eye point side,
a plastic both-surface aspherical convex lens to correct Seidel aberration;
a bioconvex lens; and
a concave meniscus lens having a concave face at the eye point side to correct color aberration.

(7) The finder optical system according to any one of (1) to (6), which is telecentric at the display device side.

(8) An image capturing apparatus, including:
an image capturing device;
a signal processing unit to convert a signal provided by the image capturing device into an image signal;
a display device to display an image based on the image signal; and
a finder optical system, including in the order from a display device side to an eye point side,
a first lens group to increase a light beam height of a light beam bundle incident from a display device side and to emit the light beam bundle to the eye point side; and
a second lens group having an image formation action.

It should be understood by those skilled in the art that various modifications, combinations, sub-combinations and alterations may occur depending on design requirements and other factors insofar as they are within the scope of the appended claims or the equivalents thereof.

What is claimed is:

1. A finder optical system, comprising in the order from a display device side to an eye point side:
a first lens group to increase a light beam height of a light beam bundle incident from a display device side and to emit the light beam bundle to the eye point side, wherein
a first lens group to increase a light beam height of a light beam bundle incident from a display device side and to emit the light beam bundle to the eye point side, wherein
the first lens group includes:
a bioconcave lens; and
a bioconvex lens adhered at an eye point side of the bioconcave lens, and wherein
the first lens group satifies the following conditional equations (1), (2). (3) and (4):

$$KH7/KH9 > 1.65 \quad (1)$$

$$KH7/KH9 < 1.9 \quad (2)$$

$$f \times (-0.1) < f45 \quad (3)$$

$$f \times 0.7 > f45 \quad (4)$$

where KH7 denotes a paraxial light beam height of a lens surface of the first lens group at the eye point side, and KH9 denotes a paraxial light beam height of a lens surface of the first lens group at the display device side, and where f denotes an omnifocal distance, and f45 denotes a focal distance of the first lens group; and
a second lens group having an image formation action, wherein
the second lens group includes, in the order from the display device side of the eye point side:
a plastic both-surface aspherical convex lens to correct Seidel aberration;
a bioconvex lens; and
a concave meniscus lens having a concave face at the eye point side to correct color aberration.

2. The finder optical system according to claim 1, wherein the first lens group corrects image field curvature aberration.

3. The finder optical system according to claim 1, wherein the finder optical system is telecentric at the display device side.

4. An image capturing apparatus, including:
an image capturing device;
a signal processing unit to convert a signal provided by the image capturing device into an image signal;
a display device to display an image based on the image signal; and
a finder optical system, including in the order from a display device side to an eye point side,
a first lens group to increase a light beam height of a light beam bundle incident from a display device side and to emit the light beam bundle to the eye point side, wherein the first lens group includes:
a bioconcave lens; and
a bioconvex lens adhered at an eye point side of the bioconcave lens, and wherein
the first lens group satisfies the following conditional equations (1), (2). (3) and (4):

$$KH7/KH9 > 1.65 \quad (1)$$

$$KH7/KH9 < 1.9 \quad (2)$$

$$f \times (-0.1) \leq f45 \quad (3)$$

$$f \times 0.7 > f45 \quad (4)$$

where KH7 denotes a paraxial light beam height of a lens surface of the first lens group at the eye point side, and KH9 denotes a paraxial light beam height of a lens surface of the first lens group at the display device side, and where f denotes an omnifocal distance, and f45 denotes a focal distance of the first lens group; and
a second lens group having an image formation action, wherein
the second lens group includes, in the order from the display device side to the eye point side:
a plastic both-surface aspherical convex lens to correct Seidel aberration;
a bioconvex lens; and
a concave meniscus lens having a concave face at the eye point side to correct color aberration.

5. The image capture apparatus according to claim 4, wherein the first lens group corrects image field curvature aberration.

6. The image capture apparatus according to claim 4, wherein the finder optical system is telecentric at the display device side.

7. A finder optical system, comprising in the order from a display device side to an eye point side:
a first lens group to increase a light beam height of a light beam bundle incident from a display device side and to emit the light beam bundle to the eye point side; and wherein
a second lens group having an image formation action, wherein the second lens group includes, in the order from the display device side to the eye point side,
a plastic both-surface aspherical convex lens to correct Seidel aberration;
a bioconvex lens; and
a concave meniscus lens having a concaver face at the eye point side to correct color aberration, and
wherein the finder optical system is telecentric at the display device side.

8. The tinder optical system according to claim 7, wherein the first lens group includes
a bioconcave lens; and
a bioconvex lens adhered at an eye point side of the bioconcave lens.

9. The finder optical system according to claim 7, wherein the first lens groups satisfies the following conditional equations (1) and (2):

$$KH7/KH9 > 1.65 \quad (1)$$

$$KH7/KH9 < 1.9 \quad (2)$$

where KH7 denotes a paraxial light beam height of a lens surface of the first lens group at the eye point side, and KH9 denotes a paraxial light beam height of a lens surface of the first lens group at the display device side.

10. The finder optical system according to claim 7, wherein the first lens groups satisfies the following conditional equations (3) and (4):

$$f \times (-0.1) \leq f45 \quad (3)$$

$$f \times 0.7 > f45 \quad (4)$$

where f denotes an omnifocal distance, and f45 denotes a focal distance of the first lens group.

11. The finder optical system according to claim 7, wherein the first lens groups corrects image field curvature aberration.

* * * * *